(12) United States Patent
Nakamura

(10) Patent No.: US 7,044,443 B2
(45) Date of Patent: May 16, 2006

(54) FLAT VALVE DEVICE

(76) Inventor: Kohei Nakamura, 17-5 Fukuzumi 1-chrome, Chitose-shi, Hokkaido (JP) 0660053

( * ) Notice: Subject to any disclaimer, the term of this patent is extended or adjusted under 35 U.S.C. 154(b) by 0 days.

(21) Appl. No.: 10/518,684

(22) PCT Filed: Jun. 11, 2004

(86) PCT No.: PCT/JP2004/008210

§ 371 (c)(1),
(2), (4) Date: Dec. 17, 2004

(87) PCT Pub. No.: WO2004/111510

PCT Pub. Date: Dec. 23, 2004

(65) Prior Publication Data

US 2005/0247903 A1    Nov. 10, 2005

(30) Foreign Application Priority Data

Jun. 12, 2003    (JP) ............................. 2003-168506

(51) Int. Cl.
*F16K 15/14*    (2006.01)
(52) U.S. Cl. ..................... 251/216; 137/223; 137/234.5
(58) Field of Classification Search ................ 251/216, 251/217, 221–225
See application file for complete search history.

(56) References Cited

U.S. PATENT DOCUMENTS

| | | | | |
|---|---|---|---|---|
| 1,993,534 A | * | 3/1935 | Stoltz ........................... | 251/216 |
| 2,488,456 A | * | 11/1949 | Walker et al. ........... | 137/234.5 |
| 4,762,145 A | * | 8/1988 | Stradella ................ | 137/599.18 |
| 4,766,628 A | * | 8/1988 | Walker ........................... | 5/706 |
| 5,203,831 A | | 4/1993 | Lind et al. | |
| 5,839,488 A | * | 11/1998 | Peters ........................ | 141/347 |
| 6,553,728 B1 | * | 4/2003 | Zurn ......................... | 52/171.3 |
| 6,648,004 B1 | * | 11/2003 | Lau ............................. | 137/223 |
| 2003/0075218 A1 | * | 4/2003 | Lau ............................. | 137/223 |
| 2003/0155008 A1 | * | 8/2003 | Wass et al. ................. | 137/223 |

FOREIGN PATENT DOCUMENTS

| | | |
|---|---|---|
| JP | 36-1653 | 2/1961 |
| JP | 60-044668 | 3/1985 |
| JP | 3-117857 | 12/1991 |
| JP | 7-18614 | 5/1995 |
| JP | 08-061534 | 3/1996 |

(Continued)

*Primary Examiner*—J. Casimer Jacyna
(74) *Attorney, Agent, or Firm*—Koda & Androlia

(57) ABSTRACT

A flat valve device of a smaller size which can complete easy and swift air evacuation, in which the airtightness of a gas-containing structure and the operational safety can be improved, requiring no extra parts.

The flat valve device includes a circular frame member 3 to be mounted on the opening of a gas-containing structure 2, a round body member 4 to be removably screwed to the inner peripheral surface 4d of the circular frame member 3, and a valve 6 provided in a valve accommodating space of the round body member 4. The round body member 4 is provided with an outward-facing through hole 4e and an inward-facing through hole 4f, while the valve 6 includes a sealing cover 6a and an energizing member 6b. The round body member 4 has a circular recess 4b and a rotating cover 5 to be rotatably pressed thereon, and the outward-facing through hole 4e is prepared off the center of the circular recess 4b, and the rotating cover 5 includes a gas injection hole 5b with the degree of eccentricity identical to that of the outward-facing through hole 4e.

6 Claims, 21 Drawing Sheets

FOREIGN PATENT DOCUMENTS

| | | |
|---|---|---|
| JP | 09-049515 | 2/1997 |
| JP | 10-167334 | 6/1998 |
| JP | 10-213243 | 8/1998 |
| JP | 3073899 | 12/2000 |
| JP | 2001-153103 | 6/2001 |
| JP | 2002-022042 | 1/2002 |
| JP | 2002-235719 | 8/2002 |
| JP | 3374190 | 2/2003 |

* cited by examiner

FLAT VALVE DEVICE

TECHNICAL FIELD

The present invention relates to a flat valve device mounted on gas-containing structures such as water playthings, automobile tires and attraction air houses for gas injection and evacuation.

BACKGROUND ART

Gas-containing structures such as water playthings and car tires conventionally employ a valve for injecting and evacuating a gas, particularly a one-way valve, which allows the flow of a gas in only one direction, but no flow in the opposite direction. Through this type of valve, the air is blown into such a structure or a gas is inflated by means of a gas-filled inflator such as an air pump. On the other hand, the gas-containing structure releases the gas by opening a valve.

For example, Japanese Unexamined Patent Publication No. 8-61534 discloses an air vent valve for air removal from the tire. In this invention, the screwing of the air vent valve into a tire valve will open the valve, thereby causing the filled air to push up the valve element against an energizing force of a spring and providing an air vent space for air release. Subsequently, the completion of air release with its pressure reduction at a predetermined level will be followed by spring restoration, whose force exceeds the released gas pressure to pull back the valve element to fill the air vent space.

Meanwhile, another Japanese Unexamined Patent Publication No. 10-213243 discloses an air valve device with a flat surface to be mounted on a tire for air inflation. In this invention, a valve body is placed under the wheel surface with a flat cover being screwed therein, to improve the tire valve appearance and prevent the valve from causing failure by coming in contact with such objects as curbs. For air inflation, the flat cover is removed and a coupler including an extensible presser pin is screwed to the valve body. With being connected to an air nozzle of an air compressor, the coupler pushes the extensible presser pin against a valve opening pin to fill the air.

1. Japanese Unexamined Patent Publication No. 8-61534
2. Japanese Unexamined Patent Publication No. 10-213243

DISCLOSURE OF THE INVENTION

Problems to be Solved by the Invention

However, in the invention as disclosed in Japanese Unexamined Patent. Publication No. 8-61534, an unwanted screwing of the air vent valve into the tire valve is required for air evacuation. In addition, this structural function is not suitable for gas-containing structures like rubber boats and attraction air houses due to its inability to remove all the filled air. Furthermore, a small quantity of the airflow of conventional types of valves to fill a gas-containing structure requires a considerable time and effort for injecting and releasing a gas. Rubber boats and air houses in particular are designed to gradually evacuate the gas by opening the valve using a high internal pressure, rather than removing the gas in a short period of time to eliminate accidental air evacuation.

On the other hand, according to the invention in Japanese Unexamined Patent Publication No. 10-213243, the valve body seems to have no outward-facing protrusion, showing a flat shape, but the valve body is merely placed unobserved inside the tire. In fact, the built-in valve, which comprises conventional-type deformation- and deterioration-prone parts such as coil springs and rubber packing, must be frequently replaced. Moreover, since the above invention is characterized by an appearance improvement, more simplified or swift air evacuation is not considered.

It is, therefore, one object of the present invention to solve the aforementioned problems by providing a flat valve device of a smaller size which can complete easy and swift air evacuation, in which the airtightness of a gas-containing structure can be maintained and the operational safety can be assured, with requiring no extra parts to be supplied.

Means for Solving the Invention

The flat valve device of the present invention is characterized by a circular frame member to be mounted on the opening of a gas-containing structure filled with the gas therein, a round body member to be mounted on the inner peripheral surface of this circular frame member, and a valve provided inside the round body member. More specifically, there is provided a valve accommodating space within said round body member to accommodate said valve, from which an outward-facing through hole and an inward-facing through hole are given so as to pass through said gas-containing structure outwardly and inwardly, respectively. In addition, the said valve includes a sealing cover to be inserted into said outward-facing through hole for maintaining an airproof state, and an energizing member which normally energizes the sealing cover toward said outward-facing through hole. The said round body member has a circular recess facing the surface with the outward-facing through hole, and a rotating cover to be pressed onto the bottom surface of said circular recess by rotation. Notably, the said outward-facing through hole is prepared off the center of said circular recess, and said rotating cover includes a gas injection hole for gas injection so as to have the degree of eccentricity identical to that of said outward-facing through hole.

In this invention, it is desirable that there be provided a female thread part for cover rotation on the inner peripheral surface of the circular recess, and a male thread part for cover rotation to be screwed thereto on the outer peripheral surface of said rotating cover.

Preferably, the circular recess in this invention is of a higher height than that of the rotating cover, and on the inner peripheral surface of the circular recess, a part for preventing cover removal may project out over said rotating cover to prevent the removal of said rotating cover.

Moreover, to facilitate the positioning of the gas injection hole, when the rotating cover is screwed to the female thread part for cover rotation to abut on the part for preventing cover removal, the gas injection hole is preferably positioned so as to connect through the outward-facing through hole.

Preferably, over the rotating cover, there is provided the part for preventing cover removal, the under surface of which may have a cover pressing part, and a pressure receiving part is provided on the upper surface of the rotating cover opposite the cover pressing part, whereby said cover pressing part will press said pressure receiving part downwardly when said rotating cover is rotated.

It is also preferable that the gas injection hole be positioned so as not to connect through the outward-facing through hole at the time the rotating cover abuts on the bottom surface of the circular recess to prevent sudden gas leakage from the valve.

Advantageous Effect of the Invention

Accordingly, it is, of course, expected that this invention provides a flat valve device of a smaller size which readily completes gas evacuation in a short period of time, in which a high airtightness of a gas-containing structure can be maintained and the operational safety can be assured, with requiring no extra parts to be supplied.

Best Mode for Carrying out the Invention

The first embodiment of a flat valve device according to the present invention will be described with reference to the accompanying drawings.

FIG. 1 shows an overall perspective view of the first embodiment of a flat valve device 1, and FIG. 2 demonstrates a sectional view taken on line 2—2 of FIG. 1. The flat valve device 1 of the first embodiment, which is several centimeters in diameter and may be shaped in approximately one centimeter, comprises a nearly ring-shaped circular frame member 3 to be mounted on the opening of a gas-containing structure 2 for gas injection and evacuation, a thin round body member 4 to be removably mounted on the inner peripheral surface of the circular frame member 3, a rotating cover 5 to be rotatably mounted on the round body member 4, and a valve 6 provided inside the round body member 4 for adjusting the gas flow.

Here, each component of the flat valve device 1 shown in the first embodiment will be described in further detail. The directions outside and inside the gas-containing structure 2 in the first embodiment are defined as the outward side and the inward side, respectively.

Firstly, as shown in FIGS. 1 and 2, the circular frame member 3 is fabricated in the form of a ring with an opening of a perfect circle therein. Its outer peripheral surface is secured to the opening of the gas-containing structure 2 for filling or evacuating a gas by means of a thermocompression method or adhesives. Also, there is provided a female thread part for cover rotation 3a on the inner peripheral surface of the circular frame member 3 to removably hold the round body member 4. On the edge of the inner peripheral surface to the outward side, a flange accommodating part 3b is given to accommodate a flange part 4i of the round body member 4 to be described later. In the first embodiment, the circular frame member 3 is fabricated from a rigid plastic material, but other less deteriorated materials such as aluminum may be employed. Though the circular frame member 3 has a circular form to eliminate stress concentration on a limited pressure bonding part for air inflation, the member may be polygonally shaped to reduce stress concentration to a certain level.

The round body member 4 is fabricated in a thin round shape from less deteriorated and high-strength rigid plastic materials as well as the circular frame member 3. The outer peripheral surface of the round body member 4 has a male thread part for cover rotation 4a for engagement with a female screw part 3a of the circular frame member 3. On the other hand, the surface of the round body member 4 to the outward side is provided with a concentric circular recess 4b having a nearly same diameter as that of the rotating cover 5. The circular recess 4b has a female thread part for cover rotation 4c on the inner peripheral surface thereof to rotatably hold the rotating cover 5.

As illustrated in FIG. 2, the round body member 4 includes a valve accommodating space 4d, being made therein in a flat and nearly circular form and given below the aforementioned circular recess 4b. The valve accommodating space 4d is provided with an outward-facing through hole 4e and an inward-facing through hole 4f, which pass through the gas-containing structure 2 outwardly and inwardly, respectively. The outward-facing through hole 4e, which runs through the bottom surface of the circular recess 4b, is prepared off the center of the circular recess 4b, not in the center. As shown in the FIG. 2, the outward-facing through hole 4e includes a straight part 4e1 in its nearly half height to the outward side with a constant internal diameter, and a tapered part 4e2 in its another nearly half height to the inward side, with an internal diameter reduced at a determined inclination toward the outward side. A sealing cover 6a of the valve 6 to be later mentioned will be inserted and sealed into the tapered part 4e2.

Subsequently, the valve 6 will be described. The valve 6, which is placed within the valve accommodating space 4d, comprises a sealing cover 6a and an energizing member 6b. The sealing cover 6a is fabricated with a truncated cone shape with the same inclination as that of the tapered part 4e2 of the outward-facing through hole 4e. Such a formation may facilitate the positioning of the sealing cover 6a in the outward-facing through hole 4e and assure cover sealing. The sealing cover 6a may be of a rubber material, but other less deteriorated metal materials such as aluminum and rigid plastics may be employed with a high-precision processing.

Meanwhile, the energizing member 6b, fabricated from an elastic member with the curved flat form, is secured to the bottom surface of the valve accommodating space 4d in such a manner that its curved convex part projects toward the outward-facing through hole 4e. By energizing the sealing cover 6a mounted on the surface of said curved convex part so as to be inserted into the tapered part 4e2 of the outward-facing through hole 4e, a high airtightness with the outward-facing through hole 4e can be ensured.

As illustrated in FIGS. 2 and 3, the outer peripheral surface of the round body member 4 is provided with a certain length of a groove for preliminary gas evacuation 4g leading to the gas-containing structure 2. The groove for preliminary gas evacuation 4g provides a vent for preliminary gas evacuation when the round body member 4 is removed from the circular frame member 3 to release all the gas.

The circular recess 4b of the round body member 4 is designed to have a height, larger than that of the rotating cover 5, to accommodate the entire rotating cover 5. A centrally-directed circular part for preventing cover removal 4h is made from the upper edge of the circular recess 4b projecting over the rotating cover 5, whereby the rotating cover 5 may not be removed from the round body member 4. A flange part 4i is extended on the upper edge of the outer peripheral surface of the round body member 4 to prevent the round body member 4 from getting into the inward side of the circular frame member 3. In addition, the first embodiment employs a rubber packing 8 between this flange part 4i and the flange accommodating part 3b. The packing 8, as shown in FIGS. 2 and 9, is inserted into a concave groove provided on the flange accommodating part 3b of the circular frame member 3. The flange part 4i of the round body member 4 includes a convex part to correspond to a concave part of the packing 8 to maintain a high airtightness after said round body member 4 is screwed.

The outwardly-directed surface of the round body member 4 (see the upper surface in FIG. 2) is provided with a pair of engaging grooves for cover rotation 4j, 4j, which are symmetrical in position. As illustrated in FIG. 2, the engaging grooves for cover rotation 4j, 4j are made on the round body member 4 in such a manner that the section shows a downward slant toward the center of the round body member 4 to be rotatably engaged by means of a proper rotating jig (not shown). As shown in FIGS. 1 and 2, the round body member 4 and the circular frame member 3 are connected with each other inside the gas-containing structure 2 by a connecting wire 7. The connection of the connecting wire 7 is rotatably mounted with no intertwining, even if the round body member 4 is rotated.

The rotating cover 5, fabricated in a thin circular form from a rigid plastic material, is inserted into the circular recess 4b. On the outer peripheral surface of the rotating cover 5, a male thread part for cover rotation 5a is provided to screw to the female thread part for cover rotation 4c of the circular recess 4b. In addition, the rotating cover 5 includes a gas injection hole 5b prepared off the center thereof passing through in the thickness direction. The gas injection hole 5b is provided so as to have a degree of eccentricity identical to that of the above mentioned outward-facing through hole 4e.

The position of the gas injection hole 5b is determined in such a manner that it is not connected through the outward-facing through hole 4e at the time the rotating cover 5 is abutted on the bottom surface of the circular recess 4b. Thereafter, the abutted rotating cover 5 will seal the outward-facing through hole 4e, resulting in a high airtightness. In the meantime, the gas injection hole 5b is positioned to connect through the outward-facing through hole 4e when the rotating cover 5 is rotated to abut it on the part for preventing cover removal 4h. Thus, the part for preventing cover removal 4h also provides a criterion for determining an air inflation position. Additionally, the surface of the rotating cover 5 to the outward side (see the upper surface in FIG. 2) is provided with a pair of engaging grooves for cover rotation 5c, 5c as well as the round body member 4.

The operations for gas injection and evacuation of the flat valve device 1 of the first embodiment will be described in detail.

Firstly, the gas injection into the gas-containing structure 2 through the flat valve device 1 is described. In this case, to connect the off-center gas injection hole 5b to the outward-facing through hole 4e, the rotating cover 5 screwed to the round body member 4 is rotated at a predetermined angle. Specifically, according to a plan view as shown in FIG. 4, the gas injection hole 5b will be rotated until it connects through the outward-facing through hole 4e. The rotation of the rotating cover 5 may employ an ungualform rotating jig (not shown) to be engaged with the engaging grooves for cover rotation 5c. In the first embodiment, if the rotating cover 5 is rotated toward the outward side to abut on the part for preventing cover removal 4h, the gas injection hole 5b may be precisely positioned on the outward-facing through hole 4e.

After the gas injection hole 5b is connected through the outward-facing through hole 4e, a gas-filled inflator 9 will be inserted into the holes 5b and 4e to provide high-pressure gas as shown in FIG. 5. This high-pressure gas presses the sealing cover 6a to the inward side against the energizing force of the energizing member 6b, thereby creating a gap with a tapered part 4e2 (see FIG. 6). After the gas comes in the gap, it passes through the valve accommodating space 4d and the inward-facing through hole 4f to be filled in the gas-containing structure 2.

The completion of gas injection in the gas-containing structure 2 will cease to supply the gas. Consequently, the sealing cover 6a is inserted into the tapered part 4e2 again due to the energizing force of the energizing member 6b to maintain a state of high airtightness inside the container. Then, even the removal of the gas-filled inflator 9 will cause no gas leakage.

After the gas-filled inflator 9 is removed, the rotating jig is engaged with the engaging grooves for cover rotation 5c, 5c again to rotate the rotating cover 5, and as shown in FIG. 2 the jig is rotated until the rotating cover 5 abuts to the bottom surface of the circular recess 4b. As illustrated in FIG. 7, this operation yields no match of the positions of the gas injection hole 5b and the outward-facing through hole 4e, resulting in the sealing of the opening of the outward-facing through hole 4e by the rotating cover 5 to assure a higher airtightness in the gas-containing structure 2. In addition, as shown in FIG. 8, a ring-shaped rubber packing 10 may be placed between the bottom surface of the circular recess 4b and the rotating cover 5 to enhance airtightness. As an alternative, a rubber piece may be mounted on a female thread part or a male thread part.

Next, the gas evacuation by means of the flat valve device 1 will be described. In this case, the round body member 4 is removed from the circular frame member 3 for swift gas release. Firstly, the rotating jig (not shown) is engaged with the engaging grooves for cover rotation 4j, 4j of the round body member 4 to be rotated to the outward side for removal. Even if the jig is accidentally rotated to the inward side, the flange part 4i will abut on the flange accommodating part 3b of the circular frame member 3, thereby preventing the falling of the round body member 4 inside the container.

As illustrated in FIG. 9, when the round body member 4 is rotated to be loosened up to over half the height to the outward side, the grooves for preliminary gas evacuation 4g will be opened to provide a gap connecting the outside with inside of the gas-containing structure 2. Consequently, the gas is gradually released from the gas-containing structure 2 through the groove for preliminary gas evacuation 4g. Such a gas evacuation approach can gradually reduce the internal pressure of the gas-containing structure 2 to avoid impact on the cover due to rapid pressure reduction.

As shown in FIG. 10, the completion of the removal of the round body member 4 from the circular frame member 3 releases the gas contained in the gas-containing structure 2 from the opening of the circular frame member 3 for a short period of time. The resultant pressure reduction by the groove for preliminary gas evacuation 4g prevents the round body member 4 from springing out due to a high internal pressure. Also, since the connecting wire 7 links the circular frame member 3 to the round body member 4, the round body member 4 will not be lost.

The above first embodiment provides a flat valve device of a smaller size which assures a high airtightness of the gas-containing structure 2 and the operational safety. Moreover, this device can perform swift gas release, with no extra parts to be supplied.

With being fabricated in the curved flat form from an elastic material, the energizing member 6b is secured to the bottom surface of the valve accommodating space 4d in such a manner that its curved convex part projects toward the outward-facing through hole 4e, and the sealing cover 6a is secured to said curved convex part. Therefore, the valve can be made flat with a simplified structure.

The shape of the outward-facing through hole 4e and the sealing cover 6a is characterized by a taper of the same inclination with hole diameters reduced to the outward side, thereby enhancing a high airtightness using a high internal pressure in the gas-containing structure 2. Even if the sealing cover 6a comes off from the outward-facing through hole 4e when the gas is injected, the sealing cover 6a can readily return to the outward-facing through hole 4e with a high probability.

The rotating cover 5, whose gas injection hole 5*b* is designed to connect through the outward-facing through hole 4*e* at a determined rotation angle, seals the outward-facing through hole 4*e* at the time the rotating cover 5 is abutted on the bottom surface of the circular recess 4*b*. Thus, the rotating cover 5 causes no sudden gas leakage with a high operational safety despite the damage of the valve 6.

The rotating cover 5 abuts on the part for preventing cover removal 4*h* even if the rotating cover 5 is excessively rotated, thereby preventing any removal of the rotating cover 5. In addition, the abutting of the rotating cover 5 on the part for preventing cover removal 4*h* will link the gas injection hole 5*b* to the outward-facing through hole 4*e*, whereby it is not necessary to visually examine the positions of the holes 5*b* and 4*e* in each gas injection operation.

Though the round body member 4 is excessively tightened to the inward side, the flange part 4*i* will always abut on the flange accommodating part 3*b* of the circular frame member 3, thus the round body member 4 will not fall into the gas-containing structure 2.

The rotation of the flat upper surfaces of the round body member 4 and the rotating cover 5 requires a rotating jig. The use of this jig, which causes no accidental gas evacuation but smooth rotation, provides both operational safety and functionality. However, the gas-filled inflator 9 may be provided with such a function. Specifically, the gas-filled inflator 9 may be provided with an engaging part (not shown) with the engaging groove for cover rotation 5*c* to insert a gas injecting outlet into the gas injection hole 5*b*. Consequently, since the gas-filled inflator 9 rotates the rotating cover 5 for gas injection and then immediately seals the outward-facing through hole 4*e*, air leakage can be prevented at the time the gas-filled inflator 9 is removed.

Referring to FIGS. 11 to 20, a flat valve device of a second embodiment of the present invention will be described in detail. If components in the second embodiment are the same or equivalent to those in the first embodiment, the above described notes are used to denote counterparts.

The flat valve device of the second embodiment is characterized by an alternative means by which said rotating cover 5 is pressed onto said circular recess 4*b*, instead of the female thread part for cover rotation 4*c* of the circular recess 4*b* and the male thread part for cover rotation 5*a* of the rotating cover 5. As shown in FIGS. 11 to 14, there is provided a cover pressing part 11 on the under surface of a part for preventing cover removal 4*h*, and a canaliform pressure receiving part 12 is given on the upper surface of a rotating cover 5 opposite the cover pressing part 11. Additionally, the under surface of a cover pressing part 11 includes an inclined plane for cover pressing 11*a*, while a pressure receiving part 12 is provided on the upper surface with an inclined plane for receiving pressure 12*a* whose inclination is almost the same as that of said inclined plane for cover pressing 11*a*. The arc length of the two pressure receiving parts 12, 12 is set as one quarter of the circumference.

An operation of this second embodiment will be described in detail. As shown in FIGS. 13 and 14, the rotation of the rotating cover 5 after air inflation will have the inclined plane for cover pressing 11*a* of the cover pressing part 11 abut on the inclined plane for receiving pressure 12*a* of the pressure receiving part 12 to press the inclined plane for receiving pressure 12*a* downwardly. As a result, with no connection between the gas injection hole 5*b* and the outward-facing through hole 4*e*, the rotating cover 5 pressed on the bottom surface of the circular recess 4*b* can eliminate air leakage. In fact, further safety measures are taken, such as air leakage prevention even for the damage of a sealing cover 6*a*.

The shapes of the cover pressing part 11 and the pressure receiving part 12 in the second embodiment may be determined in various patterns, if the rotating cover 5 can be pressed on the bottom surface of the circular recess 4*b*. In particular, as shown in FIGS. 15 and 16, the inclined plane for cover pressing 11*a* may have a steeper slope than that of the inclined plane for receiving pressure 12*a*, or may have a flat surface or a curved convex surface.

As shown in FIGS. 17 and 18, the cover pressing part 11 and the pressure receiving part 12 may have alternate shapes. Specifically, the cover pressing part 11 may be given in the canaliform form with about one quarter of the circumference of the part for preventing cover removal 4*h*, while the pressure receiving part 12 may be formed into a convex shape. Obviously, the cover pressing part 11 may be formed convex with the inclined plane for cover pressing 11*a*.

Moreover, as illustrated in FIGS. 19 and 20, the under surface of the cover pressing part 11 or the upper surface of the pressure receiving part 12 are not required to have an inclined plane. If the rotating cover 5 can be pressed on the bottom surface of the circular recess 4*b*, respective surfaces may be provided with curved convex surfaces 11*b* and 12*b*, respectively.

The embodiment of the flat valve device according to the present invention is not intended as a definition of the limits of the above described embodiment, but may be modified accordingly. For example, this embodiment discloses the groove for preliminary gas evacuation 4*g* provided on the outer peripheral surface of the round body member 4, but as shown in FIG. 21, the inner peripheral surface of the circular frame member 3 may include the groove for preliminary gas evacuation 4*g* from a nearly central position on the central axis to the outward side so as to connect between the inward and outward sides of the gas-containing structure 2. Also, this embodiment shows the packing 8 secured to the flange accommodating part 3*b*, however as shown in FIG. 21, the packing 8 may be mounted on the flange part 4*i*, and the flange accommodating part 3*b* may be provided with a concave groove for engagement with the packing 8.

Additionally, instead of the engaging grooves for cover rotation 4*j*, 4*j* and 5*c*, 5*c* for easy rotation on the outer surface of the round body member 4 and the rotating cover 5, respectively, a convex part may be prepared. Though this embodiment employs only one inward-facing through hole 4*f*, a plurality of holes may be provided for increasing permeability.

DESCRIPTION OF THE MARKS

Figure 1:
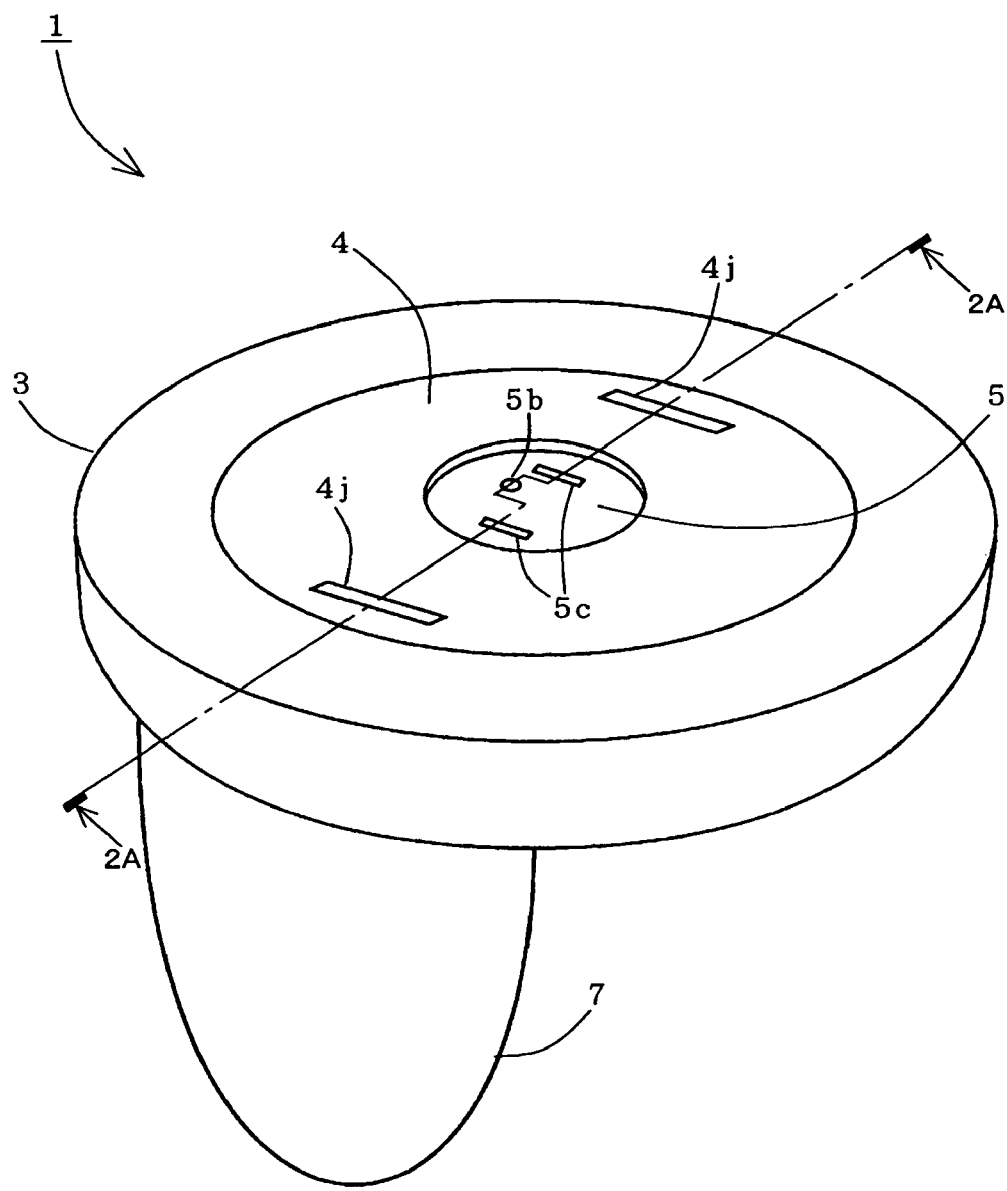
FIG. 1 is an overall perspective view of a first embodiment of a flat valve device according to the present invention.
Figure 2:
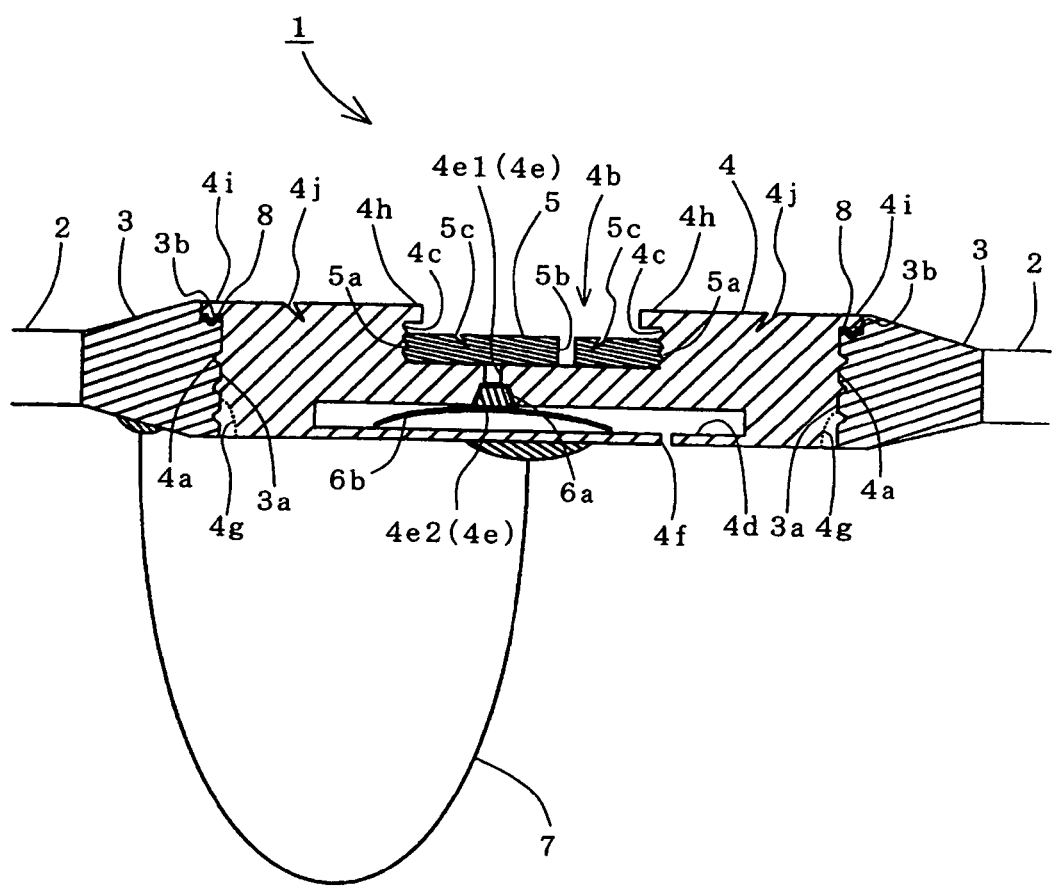
FIG. 2 is a sectional view taken on line 2—2 of FIG. 1.
Figure 3:
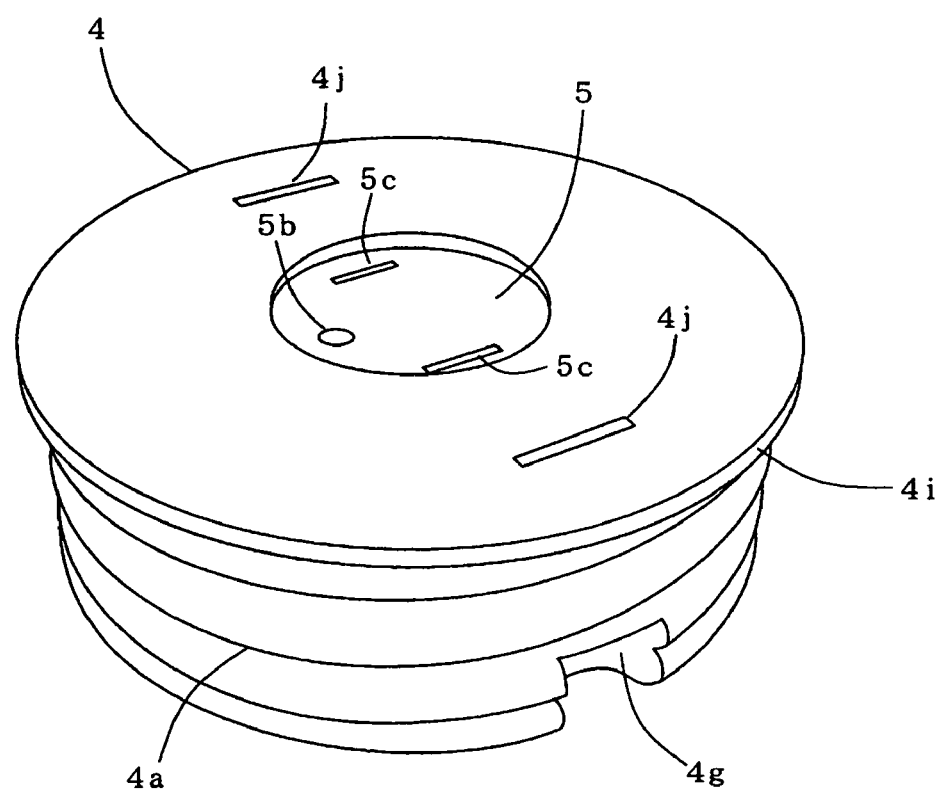
FIG. 3 is a perspective view of the first embodiment of a round body member and a rotating cover.
Figure 4:
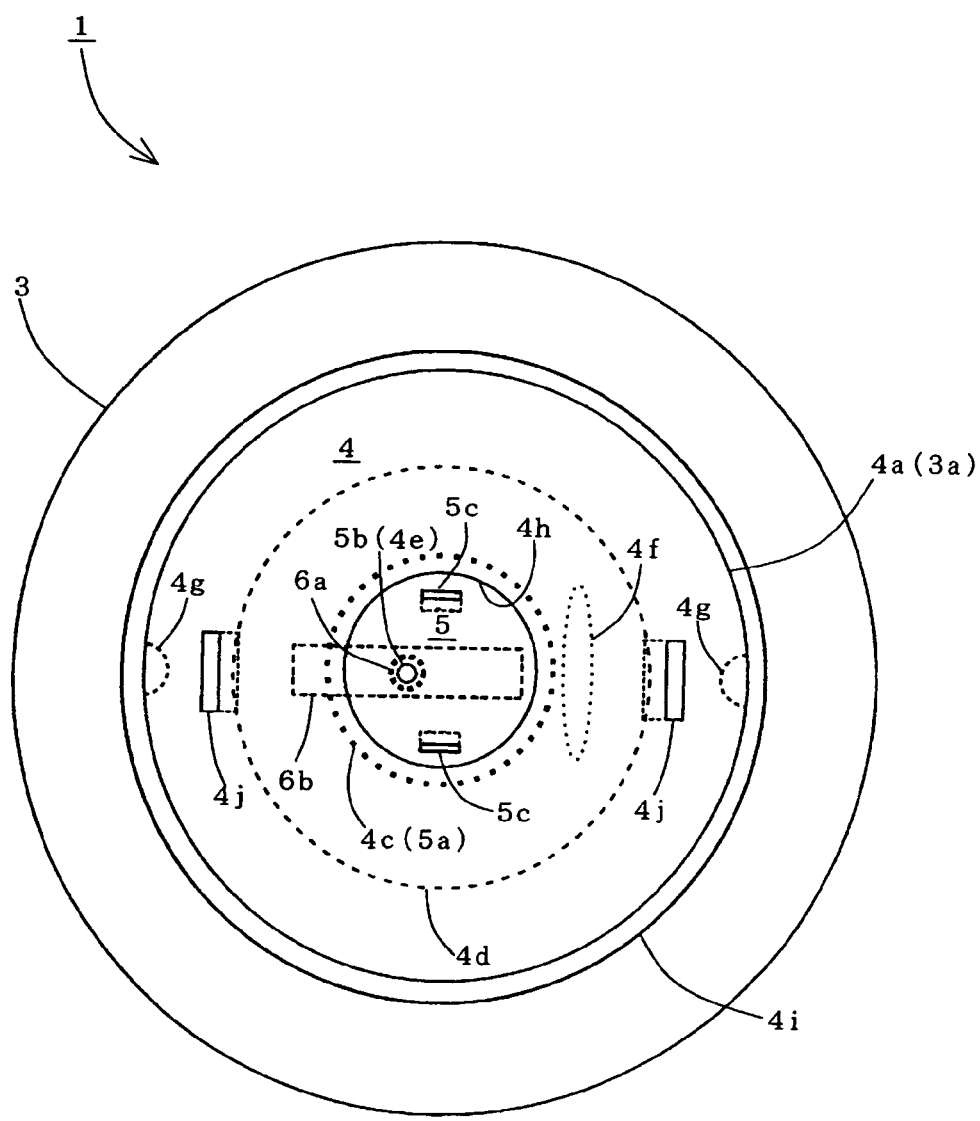
FIG. 4 is a plan perspective diagram of the first embodiment illustrating a state of injecting a gas.
Figure 5:
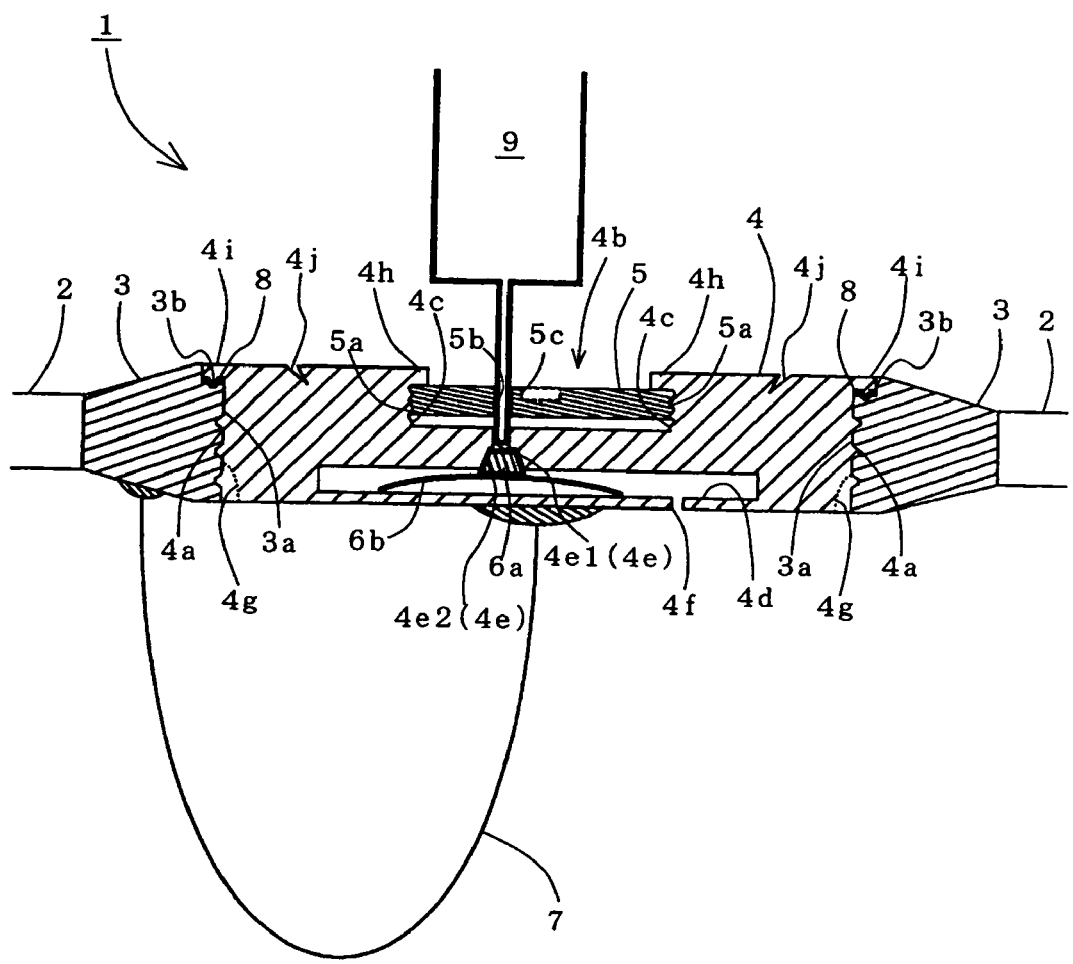
FIG. 5 is a sectional side view of the first embodiment illustrating a state of injecting a gas.
Figure 6:
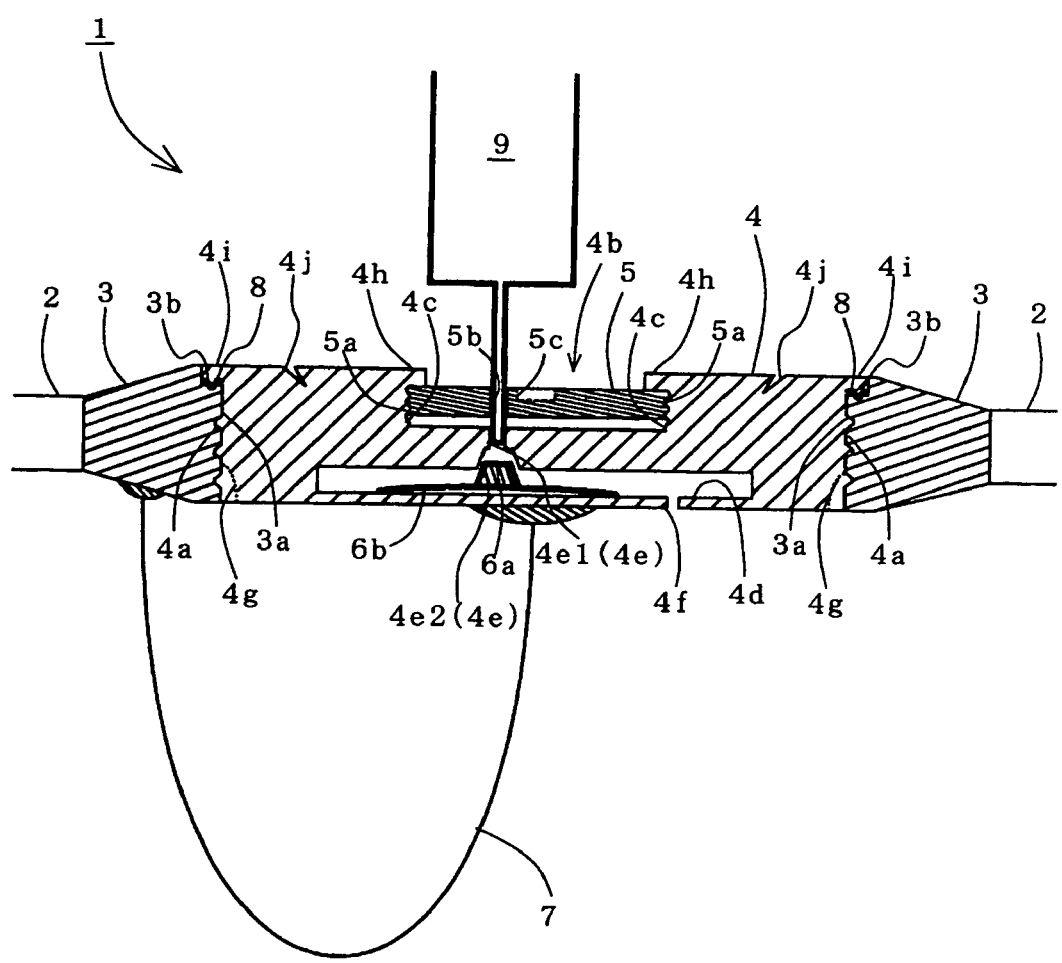
FIG. 6 is a sectional side view of the first embodiment illustrating a state of inflating a gas.
Figure 7:
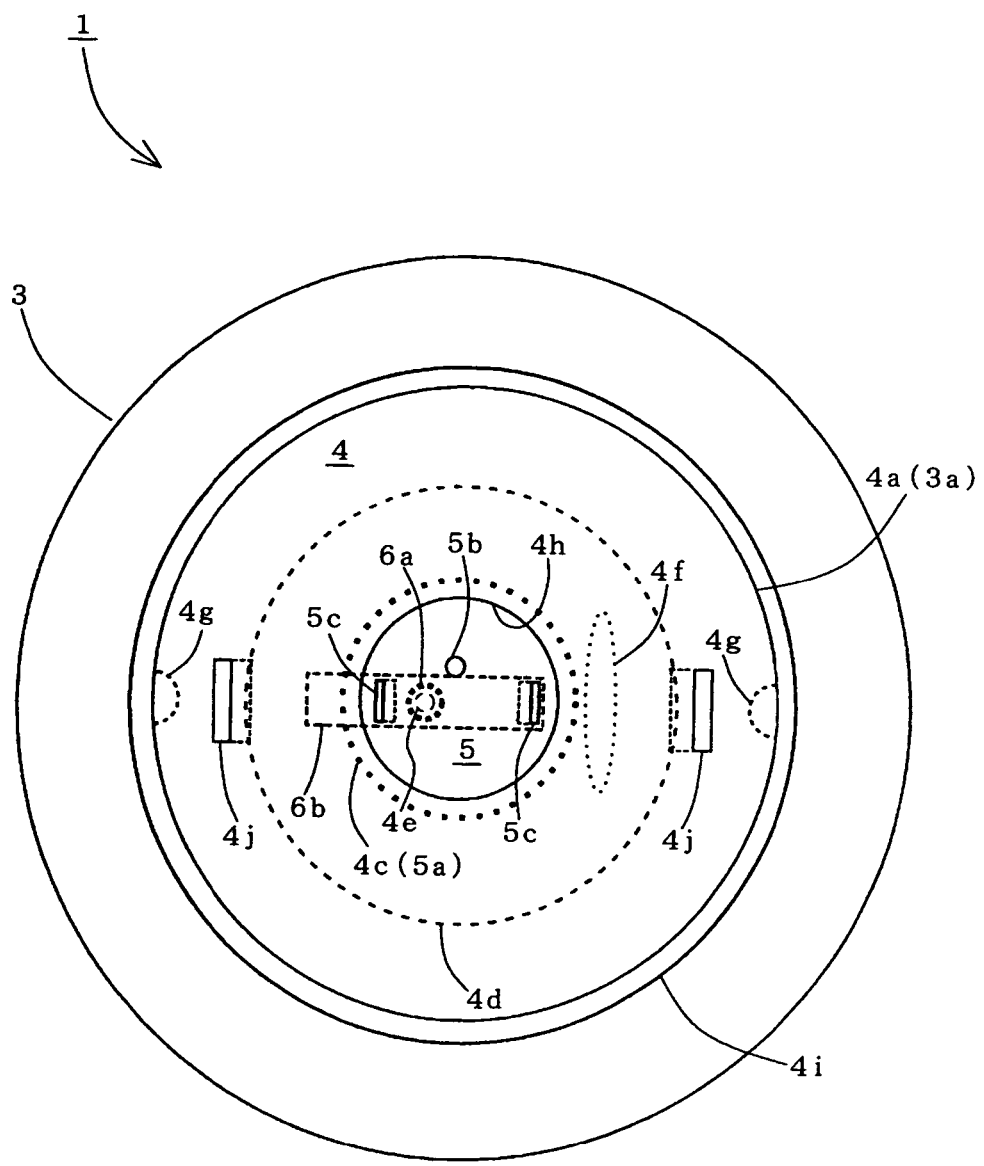
FIG. 7 is a plan perspective diagram of the first embodiment illustrating an airproof state.
Figure 8:
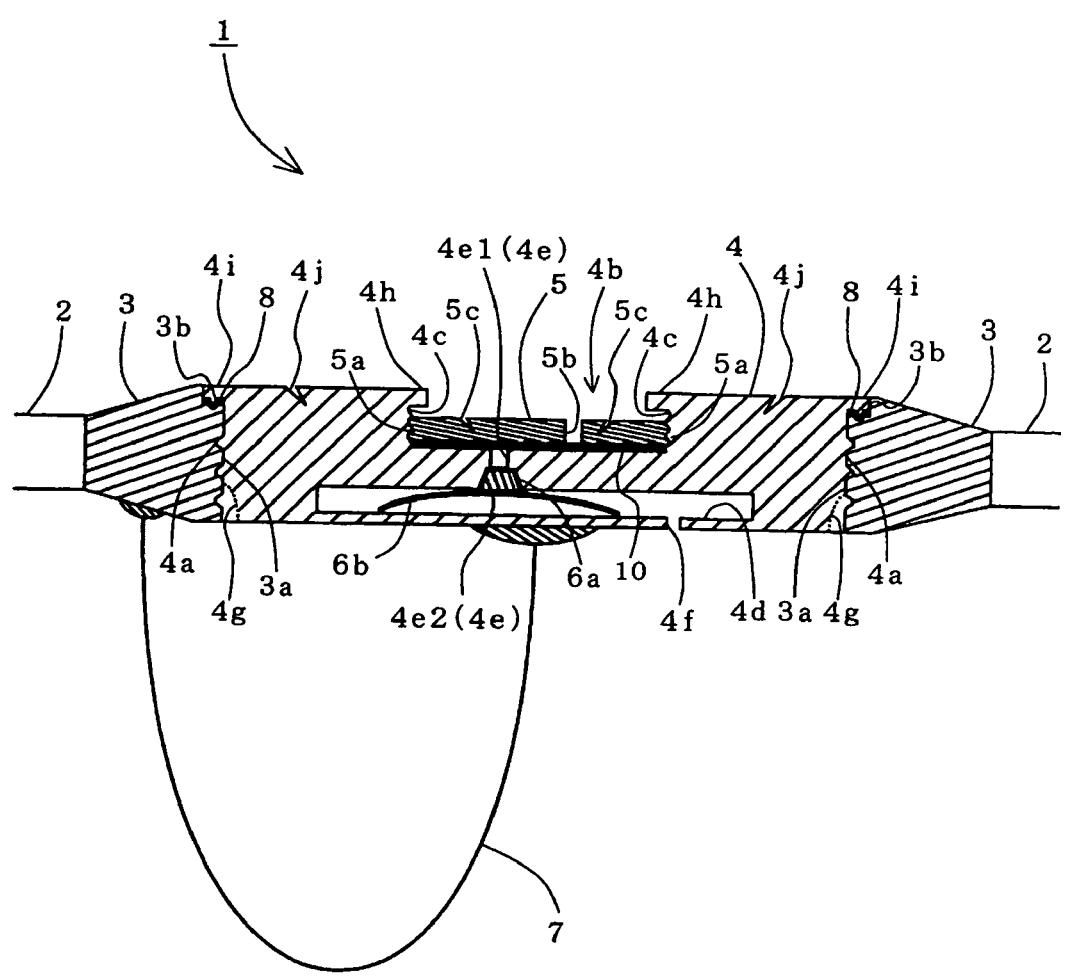
FIG. 8 is a sectional side view of the first embodiment illustrating a state of placing a packing between a rotating cover and a circular recess.
Figure 9:
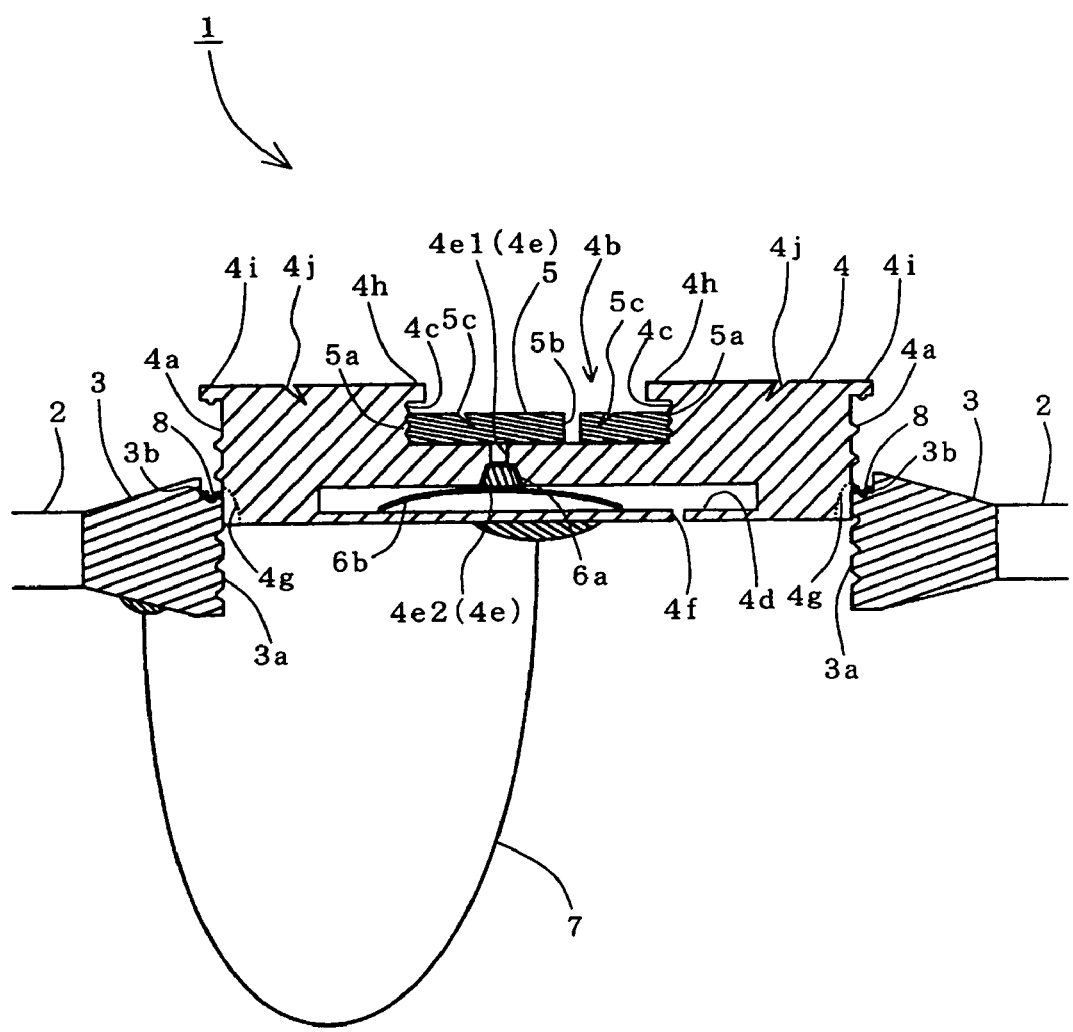
FIG. 9 is a sectional side view of the first embodiment illustrating a state of initial gas evacuation through a groove for preliminary gas evacuation.
Figure 10:
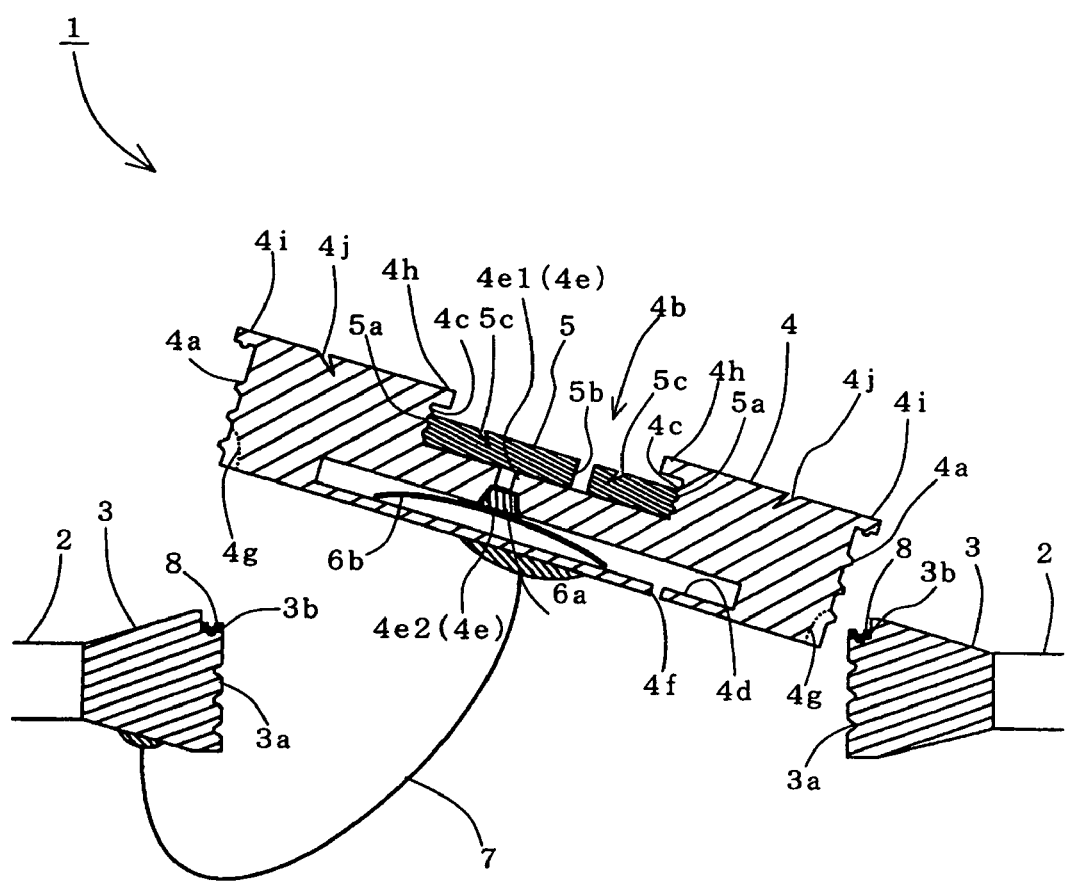
FIG. 10 is a sectional side view of the first embodiment illustrating a state of removing a round body member.
Figure 11:
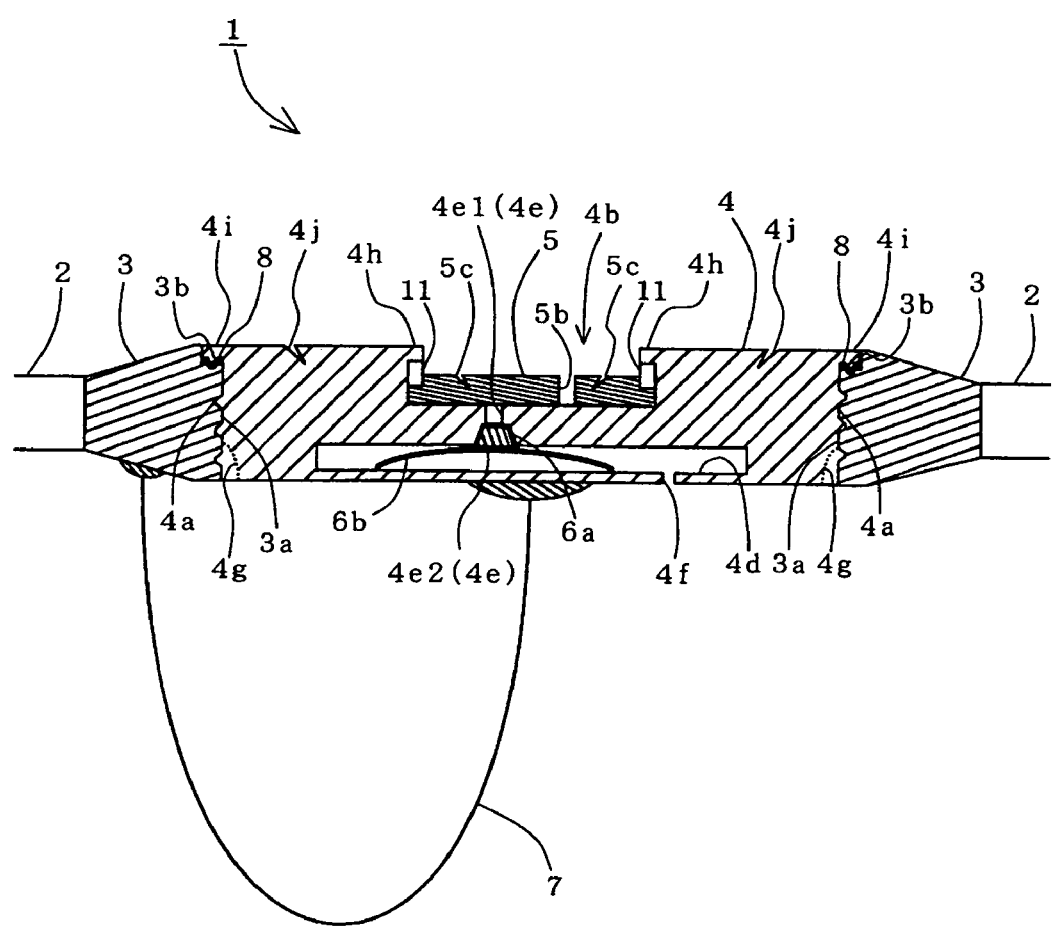
FIG. 11 is a sectional view of a second embodiment of a flat valve device according to the present invention.
Figure 12:
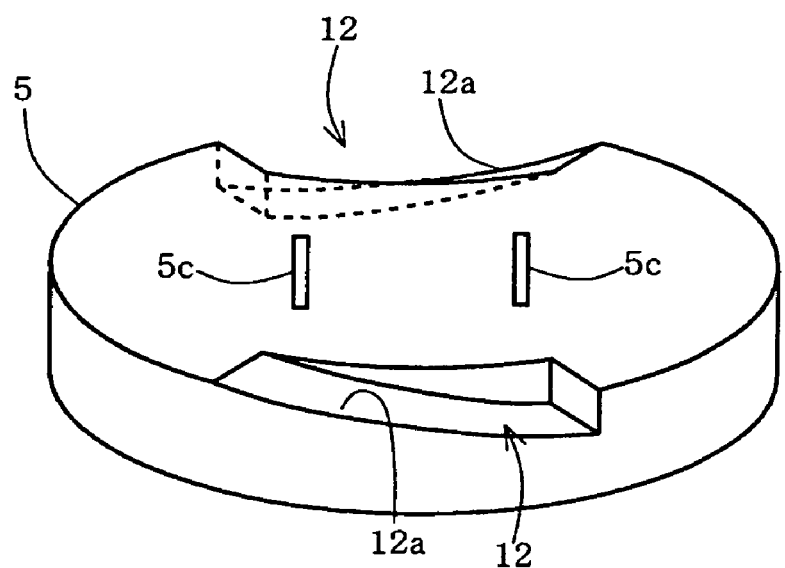
FIG. 12 is a schematic perspective view of the second embodiment illustrating a rotating cover.
Figure 13:
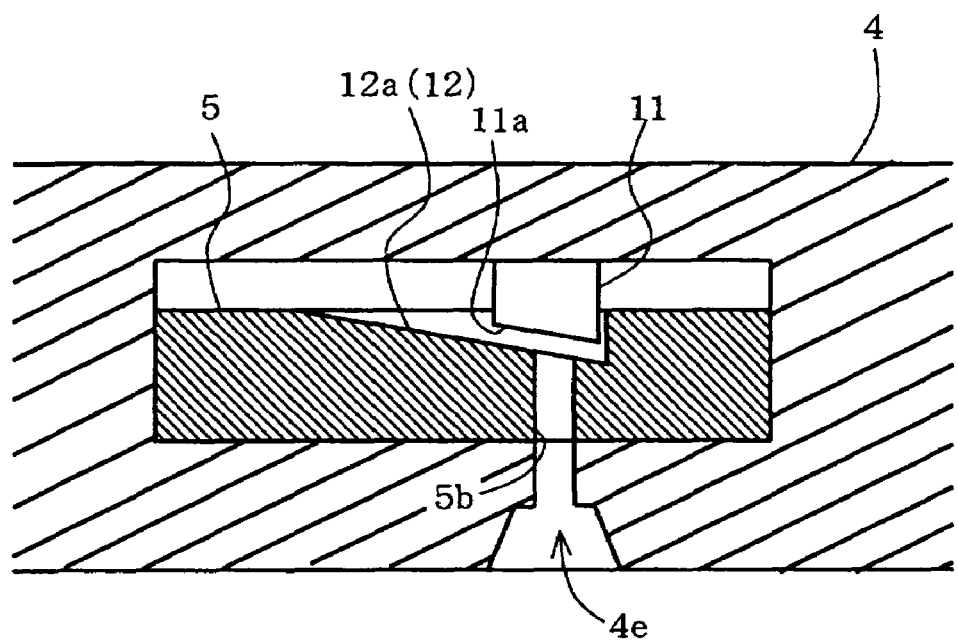
FIG. 13 is a pattern diagram of the second embodiment illustrating the positional relationship of a cover pressing part and a pressure receiving part when the gas is being inflated.
Figure 14:
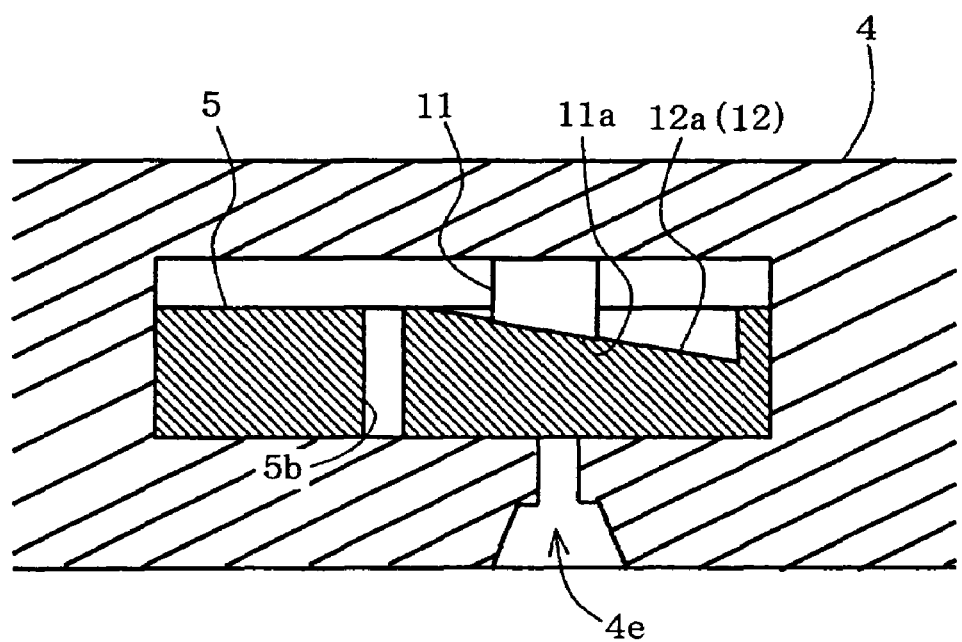
FIG. 14 is a pattern diagram of the second embodiment illustrating the action of a cover pressing part on a pressure receiving part when a rotating cover is pressed on the bottom surface of a circular recess after gas injection.
Figure 15:
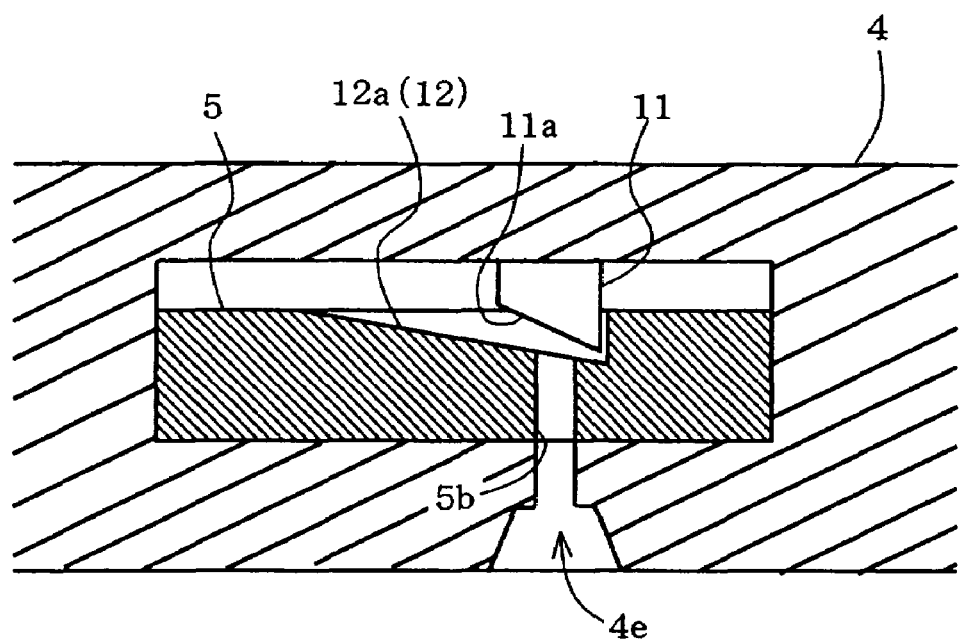
FIG. 15 is a pattern diagram of the second embodiment illustrating the positional relationship of a cover pressing part and a pressure receiving part when the gas being is injected.
Figure 16:
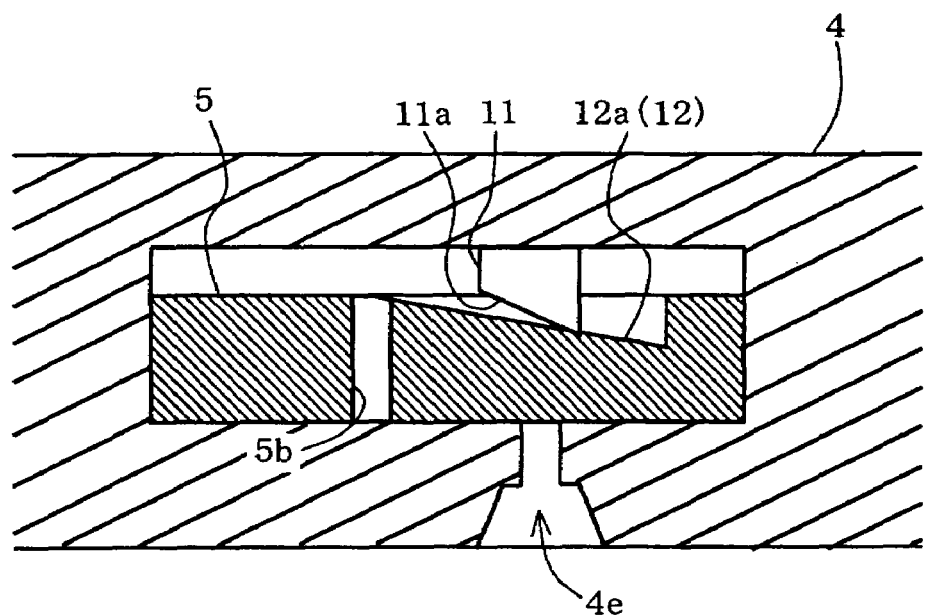
FIG. 16 is a pattern diagram of the second embodiment illustrating the action of a cover pressing part on a pressure receiving part when a rotating cover is pressed on the bottom surface of a circular recess after gas injection.
Figure 17:
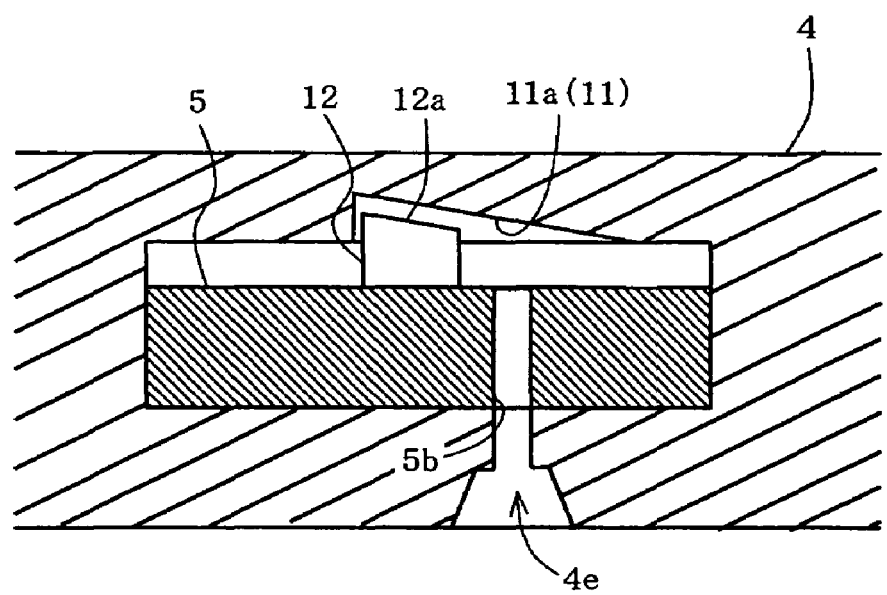
FIG. 17 is a pattern diagram of the second embodiment illustrating the positional relationship of a cover pressing part and a pressure receiving part when the gas is being injected.
Figure 18:
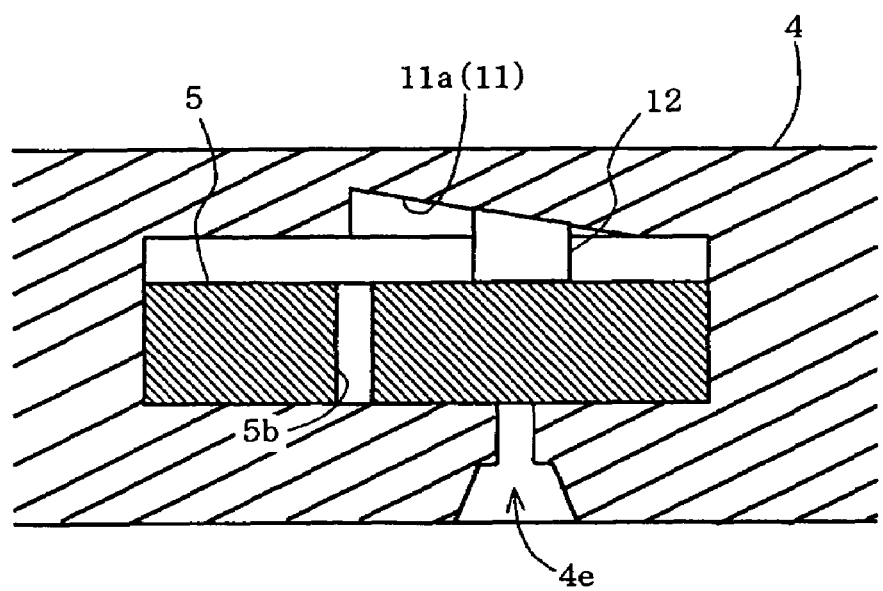
FIG. 18 is a pattern diagram of the second embodiment illustrating the action of a cover pressing part on a pressure receiving part when a rotating cover is pressed on the bottom surface of a circular recess after gas injection.
Figure 19:
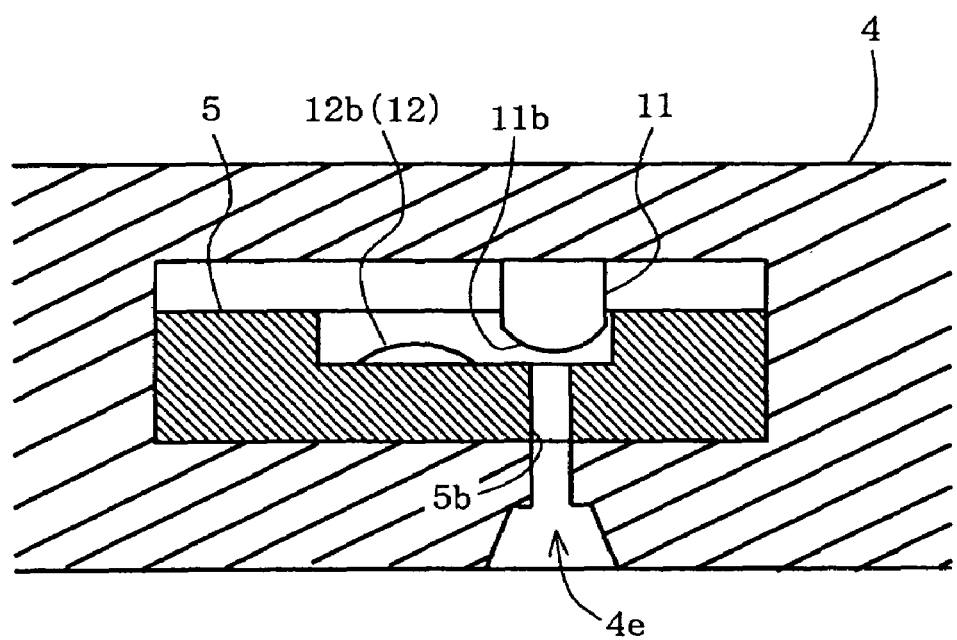
FIG. 19 is a pattern diagram of the second embodiment illustrating the positional relationship of a cover pressing part and a pressure receiving part when the gas is being injected.
Figure 20:
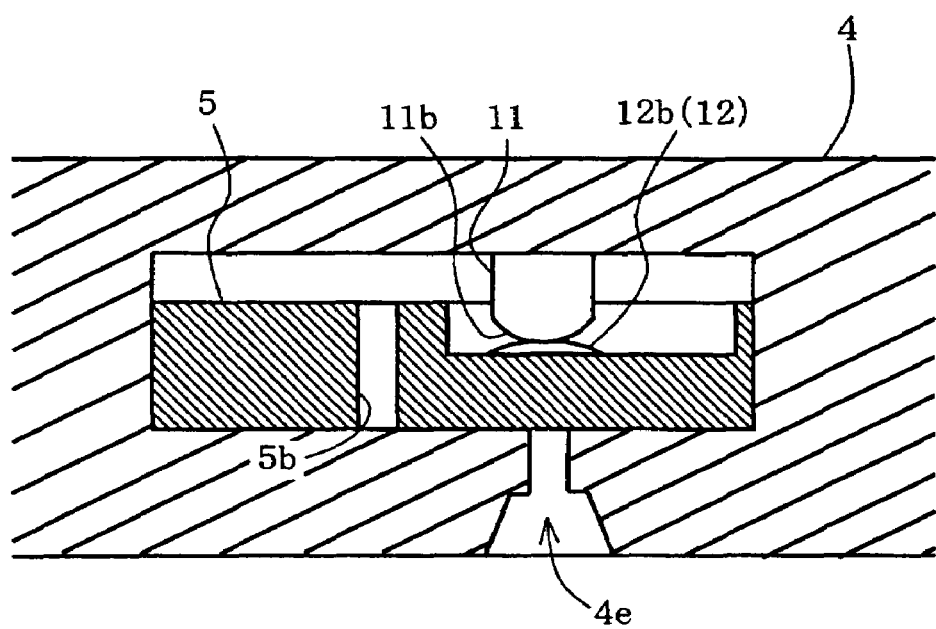
FIG. 20 is a pattern diagram of the second embodiment illustrating the action of a cover pressing part on a pressure receiving part when a rotating cover is pressed on the bottom surface of a circular recess after gas injection.
Figure 21:
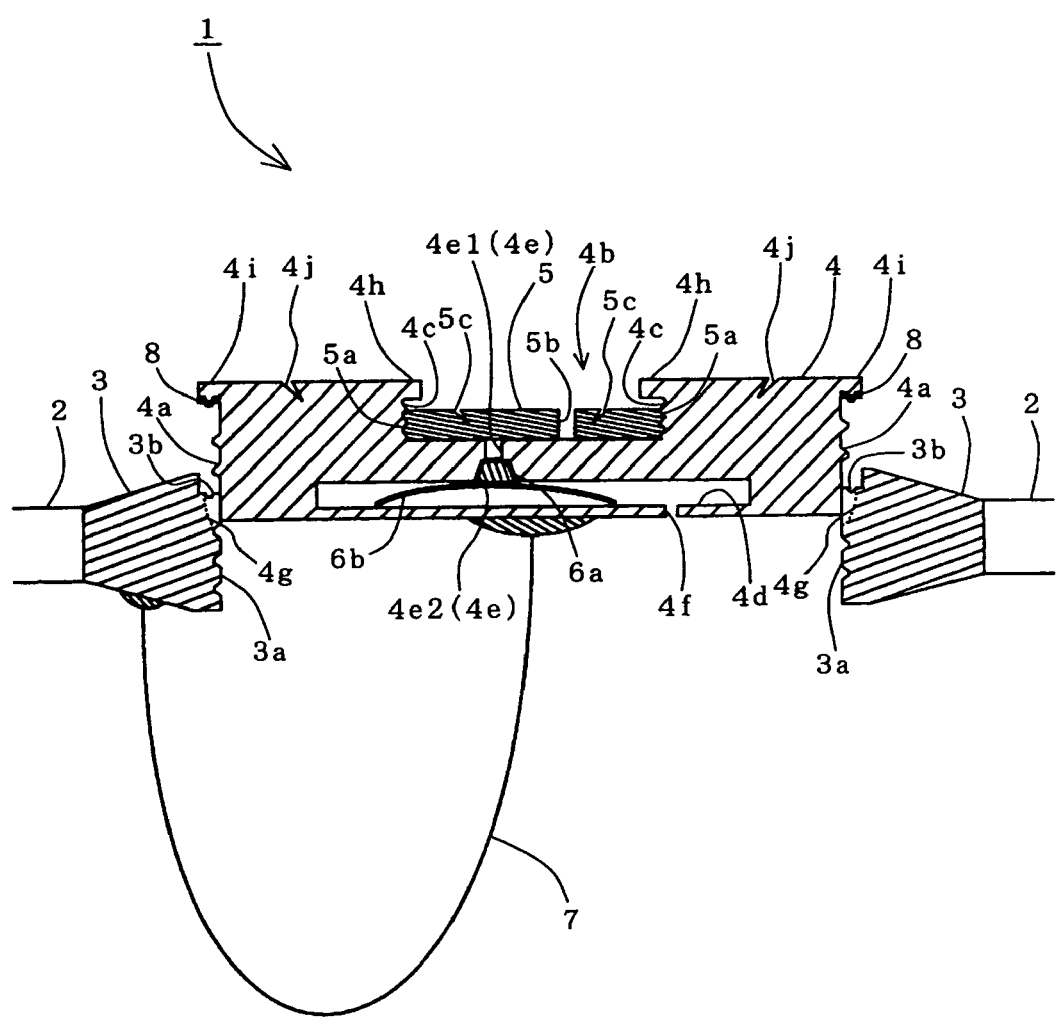
FIG. 21 is a sectional side view of an alternative embodiment illustrating a groove for preliminary gas evacuation and a packing according to the first embodiment of the present invention.

1: flat valve device
2: gas-containing structure
3: circular frame member
3a: female thread part for member engagement
3b: flange accommodating part
4: round body member
4a: male thread part for member engagement
4b: circular recess
4c: female thread part for cover rotation
4d: valve accommodating space
4e: outward-facing through hole
4e1: straight part
4e2: tapered part
4f: inward-facing through hole
4g: groove for preliminary gas evacuation
4h: part for preventing cover removal
4i: flange part
4j: engaging groove for cover rotation
5: rotating cover
5a: male thread part for cover rotation
5b: gas injection hole
5c: engaging groove for cover rotation
6: valve
6a: sealing cover
6b: energizing member
7: connecting wire
8: packing
9: gas-filled inflator
10: packing
11: cover pressing part
11a: inclined plane for cover pressing
12: pressure receiving part
12a: inclined plane for pressure receiving

The invention claimed is:

1. A flat valve device comprising:
a nearly ring-shaped circular frame member to be mounted on the opening of a gas-containing structure filled with the gas therein; and
a round body member to be mounted on the inner peripheral surface of the circular frame member; and
a valve provided inside the round body member,
said circular frame member having a female thread part for cover rotation to removably secure said round body member to the inner peripheral surface thereof,
said round body member having a male thread part for cover rotation to be screwed to said female thread part for cover rotation on the outer peripheral surface thereof, and having a valve accommodating space therein to accommodate said valve, from which an outward-facing through hole and an inward-facing through hole are provided so as to pass through said gas-containing structure outwardly and inwardly, respectively,
said valve having a sealing cover to be inserted into said outward-facing through hole for maintaining an airproof state, and an energizing member which normally energizes the sealing cover toward said outward-facing through hole,
said round body member having a circular recess facing the surface with the outward-facing through hole, and a rotating cover to be pressed onto the bottom surface of said circular recess by rotation,
said outward-facing through hole being prepared off the center of said circular recess,
said rotating cover having a gas injection hole for gas injection so as to have the degree of eccentricity identical to that of said outward-facing through hole.

2. The flat valve device set forth in claim 1, wherein:
a female thread part for cover rotation is provided on the inner peripheral surface of said circular recess, and a male thread part for cover rotation to be screwed thereto is given on the outer peripheral surface of said rotating cover.

3. The flat valve device set forth in claim 2, wherein:
said circular recess has a higher height than that of the rotating cover, and on the inner peripheral surface of said circular recess, a part for preventing cover removal projects out over said rotating cover to prevent the removal of said rotating cover.

4. The flat valve device set forth in claim 3, wherein:

the gas injection hole is positioned so as to connect through the outward-facing through hole, when said rotating cover is screwed to the female thread part for cover rotation to abut on the part for preventing cover removal.

5. The flat valve device set forth in claim 1, wherein:

a part for preventing cover removal is provided over said rotating cover, and the under surface of which includes a cover pressing part, and a pressure receiving part is provided on the upper surface of said rotating cover opposite the cover pressing part, whereby said cover pressing part will press said pressure receiving part downwardly when said rotating cover is rotated.

6. The flat valve device set forth in any one of claims 1 through 5, wherein:

said gas injection hole is positioned so as not to connect through the outward-facing through hole at the time the rotating cover is pressed onto the bottom surface of the circular recess.

\* \* \* \* \*

UNITED STATES PATENT AND TRADEMARK OFFICE
CERTIFICATE OF CORRECTION

PATENT NO. : 7,044,443 B2  Page 1 of 1
APPLICATION NO. : 10/518684
DATED : May 16, 2006
INVENTOR(S) : Kohei Nakamura It is certified that error appears in the above-identified patent and that said Letters Patent is hereby corrected as shown below:

Title Page; Item [76] Inventor:
Change "Kohei Nakamura, 17-5 Fukuzumi 1-chrome, Chitose-shi, Hokkaido (JP) 0660053" to --KOHEI NAKAMURA, 3-13, ODORI-NISHI 9-CHOME, CHUO-KU, SAPPORO-SHI, HOKKAIDO 060-0042, JAPAN--

Signed and Sealed this

Twenty-first Day of April, 2009

JOHN DOLL
*Acting Director of the United States Patent and Trademark Office*